UNITED STATES PATENT OFFICE.

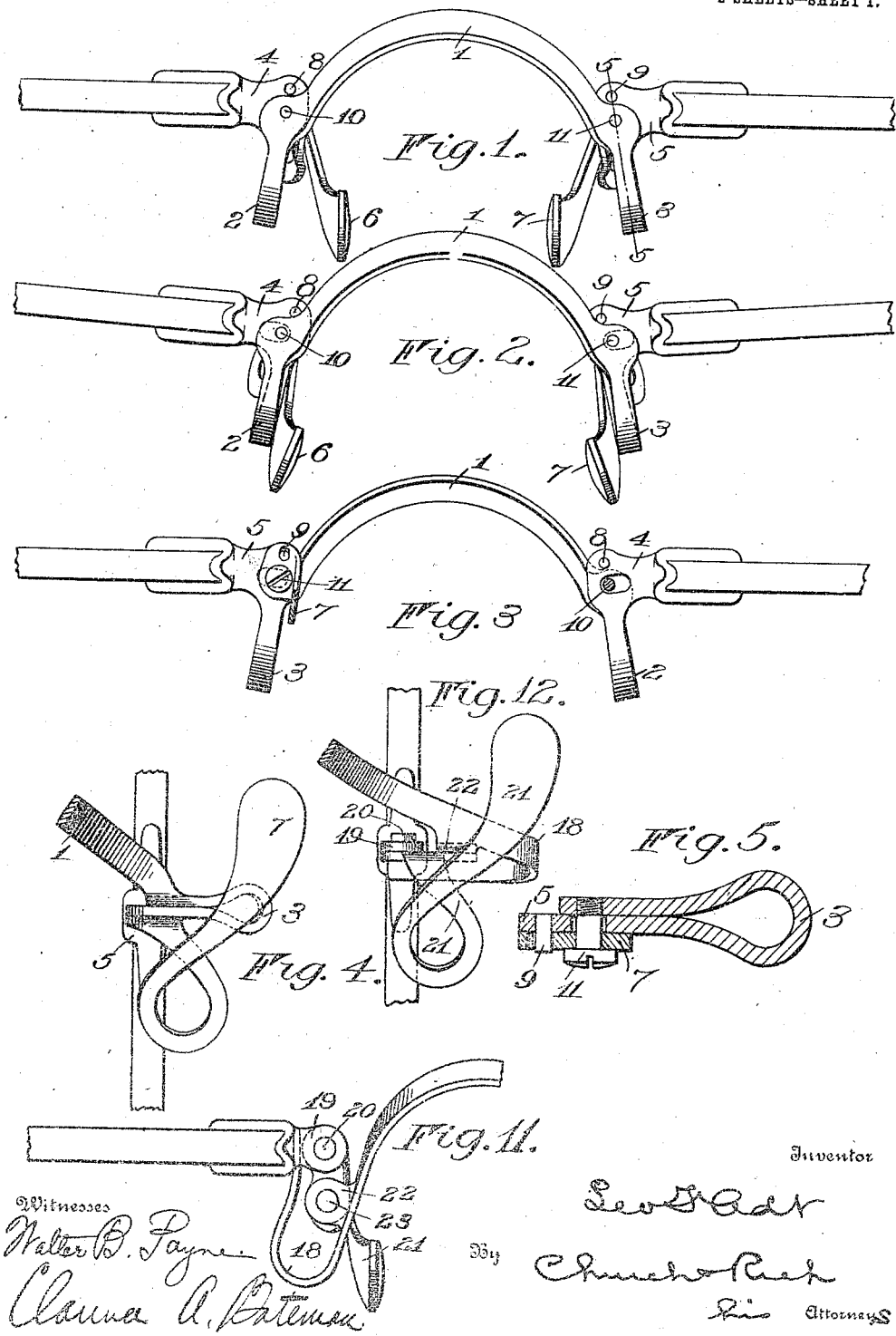

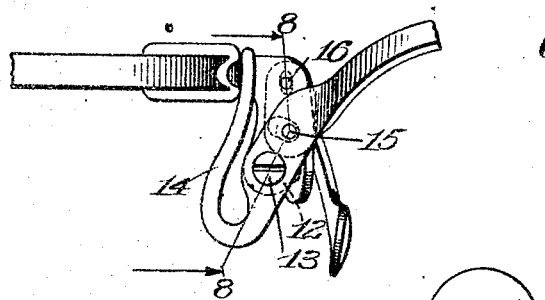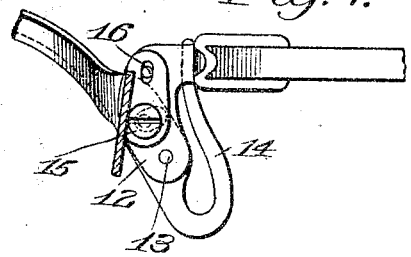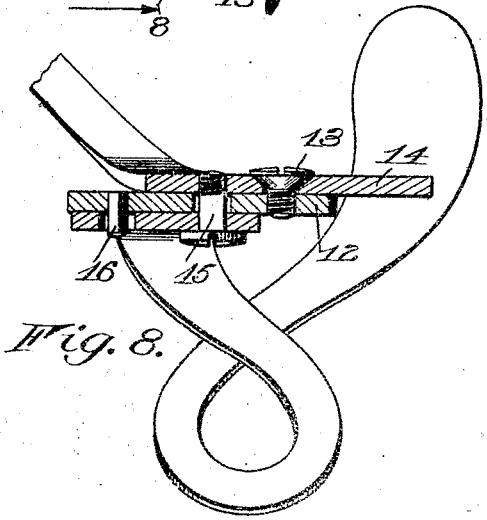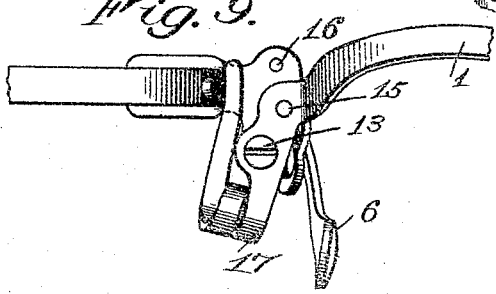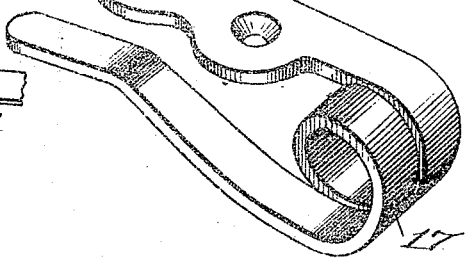

LEO F. ADT, OF ALBANY, NEW YORK.

EYEGLASSES.

963,029.  Specification of Letters Patent.  Patented July 5, 1910.

Application filed June 28, 1906, Serial No. 323,924. Renewed June 18, 1908. Serial No. 439,230.

*To all whom it may concern:*

Be it known that I, LEO F. ADT, of Albany, in the county of Albany and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses, and has for its object to provide certain improvements that will enable the use of a relatively rigid bridge for maintaining the proper optical relation between the lenses, and embodying novel devices that are controlled by the movement of the lenses for producing the requisite movement of the nose guards for fitting and removing the eyeglasses.

To these and other ends the invention consists in certain improvements and combinations of parts, all as will be hereinafter more fully explained, the novel features being pointed out in the claims at the end of the specification.

In the drawings: Figure 1 represents a top plan view of a pair of eyeglasses constructed in accordance with my invention, the guards being in proximated position. Fig. 2 is a view similar to Fig. 1 showing the nose guards separated. Fig. 3 is a bottom plan view of another form of the invention.
operating devices or connections for the nose guards. Fig. 4 represents a transverse section through the bridge and looking toward the right in Fig. 1. Fig. 5 represents a section on the line 5—5 of Fig. 1. Fig. 6 is a top plan view of a portion of a mounting showing a modified form of the invention. Fig 7 is a bottom plan view of the construction shown in Fig. 6 with the under portion of the guard removed. Fig. 8 represents a section on the line 8—8 of Fig. 6 looking in the direction of the arrows. Fig. 9 is a top plan view of another form of the invention. Fig. 10 is a perspective view of the end of the spring employed in the form shown in Fig. 9, and Figs. 11 and 12 show another embodiment of my invention.

Similar reference numerals in the several figures indicate similar parts.

My present invention provides an im-
proved form of eyeglasses, wherein a comparatively rigid bridge may be employed to insure maintenance of the proper optical relation between the lenses, and wherein provision is made for a relative turning or tilting of the lenses to cause operation, preferably in increased proportion, of the nose guards, portions of the bridge itself preferably serving to return the guards and lenses to normal position, or for holding the eyeglasses in proper relation to the eyes of the wearer.

The embodiment of my invention shown in Figs. 1 to 5 comprises generally, a bridge having preferably the substantially rigid central portion 1, usually bowed forwardly to span the wearer's nose, and having its arms extending rearwardly; thence turning vertically and doubling forwardly to form a pair of resilient loops 2 and 3 arranged preferably in rear of the plane of the lenses, the forwardly-extending or free arms of these loops being rigidly attached to suitable lens-attaching devices 4 and 5 respectively, the latter being attached to the lenses, and movable therewith, as the lenses are tilted or turned. The nose guards 6 and 7, which may be of any preferred form, have pivotal connection at 8 and 9 to their respective lens-attaching devices, while the bridge is provided at points intermediate of its central portion and the loops 2 and 3 with screws or projections 10 and 11, extending upwardly through longitudinal slots in the attaching devices, and serving as pivots for their respective nose guards at points preferably in rear of the pins 8 and 9 respectively, screws being preferably employed as the guards may be removed by removal of these screws. A mounting of the kind described is fitted to the nose by relatively tilting or turning the lenses in the manner shown in Fig. 2, the relative movement of the lenses in a horizontal plane permitted by the yielding of the resilient loops 2 and 3 of the bridge, causing relatively inward movement of the operating pins 8 and 9 relatively to the pivotal centers 10 and 11 on the intermediate portions of the bridge, and this relative movement of the pins 8—9 and 10—11 respectively, will cause a separating movement of the guards about the pivots 10 and 11 as centers, and when the pressure is removed from the lenses, the action of the loops 2 and 3 will operate to proximate the nose guards and return the lenses to normal position.

In Figs. 6 to 8 inclusive, the end of the bridge is formed somewhat differently from that employed in the form just described, in that the intermediate portions of the bridge are each pivotally attached to the rearward extension 12 of the respective attaching device by the pivot pin or screw 13, a yielding or resilient extension 14 of the bridge extending beyond the pivot thereof and doubled forwardly so as to engage a suitable portion of the mounting that is movable with the lens, such as a part of the lens-attaching device. The nose guard, in the present instance, is mounted substantially the same as in the form first described, the pivot pin or screw 15 passing through the guard from the under side and extending through a slot in the lens-attaching device to connect with the bridge, at a point intermediate between its central portion and its pivot screw 13, the operating pin 16 movable with the lens serving to operate the guard about its pivot. In operating eyeglasses embodying this form of the invention the forward movement of the outer ends of the lenses will cause the latter to turn about the screws 13 as centers, moving the operating pin 16 for the guard inwardly past the pivotal center 15 of the guard, and thus producing a relatively separating or opening movement of the nose-engaging portion of the guard.

In Figs. 9 and 10 the resilient ends of the spring are formed somewhat differently from those used in the previously described forms, in that each is provided with one or more convolutions to form preferably, a helical loop or coil 17, the increased length of the material affording increased action for the bridge when the lenses are operated, the operative connection between the guard and the spring and lens-attaching device being, if so desired, substantially the same as that employed in Figs. 6 to 8.

Figs. 11 and 12 show another form of the invention, wherein the ends of the bridge are extended in a direction downwardly and rearwardly to a point in rear of the lenses, thence doubled outwardly and forwardly to form substantially horizontal loops or bends 18, the free ends of these loops being each rigidly connected to its corresponding lens-attaching device. The latter is provided with an inwardly extending lug 19 having a pivot 20 for the nose guard 21, and the bridge is provided preferably at a point intermediate its central portion and the loop, with a lug 22 having a pin or projection 23 arranged to coöperate with the nose guard to turn it whenever relative turning movement is imparted to the lenses, the distance between the points where the guard is connected to the relatively movable parts of the mounting being adjusted so that the requisite movement of the guards may be obtained with a given movement of the lenses. This form of the invention permits the use of a long and well shaped bridge, which, if desired may extend along or fit the sides of the wearer's nose, after the manner of the so called "saddle bridge," and this form of the invention is particularly advantageous in cases where the bridge is composed of substantially flat material, as the bends or resilient portions of the bridge are so arranged that the action thereon is in a direction flatwise of the material, and this insures proper action of the mounting.

Eyeglass mountings constructed in accordance with my present invention permit the use of a substantially rigid bridge for connecting the lenses, wherein the maintenance of their pupilary distance and other optical relations is insured, and the necessary movement of the nose guards in fitting and removing the eyeglasses, is produced by a comparatively slight turning movement of the lenses, as the arrangement of the pivotal centers of the guards and their operating projections is such that an amplified or increased movement is given to the guards when the lenses are turned through a given angle. Eyeglasses of this form may be used to advantage in place of the ordinary spring bridge construction, in that while they afford the requisite movement of the guards, this movement is obtained by a comparatively slight movement of the lenses, and liability of breakage of the parts is minimized, and as the resilient portions of the bridge are arranged in rear of the plane of the lenses, the mounting does not appear conspicuous when viewed from the front, and this is particularly so when the resilient loops are extended rearwardly in a substantially horizontal plane, as is generally preferable, while by forming these loops as portions of the bridge, ample strength and action is obtained without requiring the use of separate springs and parts liable to loosening or breakage. It is also generally preferable to employ a bridge embodying a relatively rigid central portion, and resilient or yielding portions beyond, as the rigid portion of the bridge not only insures maintenance of the pupilary distance and other important optical relations of the lenses as is obtained with spectacles, but when the ends of this rigid portion are arranged to operate above or otherwise in close proximity to the flat surfaces of the attaching devices, they provide rigid guides for insuring the relative turning movement of the lenses in a given plane. While it is generally preferable to arrange the nose guards for an increased angle of movement when the lenses are turned, it will be understood that a bridge embodying my invention is well adapted for use in cases wherein the guards are directly attached to the lenses, and are separated by relative turning movement of the lenses, although in such cases, a greater movement of the lenses is necessary in order to obtain the requisite movement of the nose guards.

It will, of course, be understood that those claims, in which the lens attaching devices are described as being mounted to turn or swing on the bridge, are intended to cover constructions in which the connections between the lens attaching devices and the bridge are in the form of pivots, instead of resilient loops as herein shown.

I claim as my invention:

1. In eyeglasses, the combination with the lenses, mounted to swing in a horizontal plane, and nose guards, of a bridge having means for insuring relative turning movement of the lenses in substantially a horizontal plane for operating the nose guards, and resilient portions forming parts of the bridge and serving to proximate the nose guards.

2. In eyeglasses, the combination with the lenses mounted to swing in a horizontal plane, and nose guards, of a bridge having guides for insuring relative turning movement of the latter in a horizontal plane, portions of the bridge beyond said guides serving as springs for operating nose guards.

3. In eyeglasses, the combination with the lenses mounted to swing in a horizontal plane, and nose guards, of a bridge having rigid guiding portions for insuring relative turning movement of the lenses in a given plane, continuations of the bridge beyond said guiding portions serving to return the lenses and guards to normal positions.

4. In eyeglasses, the combination with the lenses having rigid attaching devices thereon mounted to swing in a horizontal plane and nose guards, of a bridge for connecting the lenses having portions guided on said attaching devices to insure relative turning movement of the lenses in a given plane, parts of the bridge beyond said guiding portions serving as springs for the nose guards.

5. In eyeglasses, the combination with the lenses having suitable attaching devices with rigid guiding portions thereon, and nose guards, of a bridge having resilient portions arranged to operate the lenses, and rigid guiding portions on the bridge intermediate the resilient portions for insuring turning movement of the lenses in a given plane.

6. In eyeglasses, the combination with the lenses, of a bridge connecting them and having suitable connections with the lenses to permit relative swinging movement thereof, nose guards, and operative connections between each guard and a lens and between each guard and the bridge producing increased movement of the guards when the lenses are turned.

7. In eyeglasses, the combination with the lenses, of a bridge having suitable connections with the lenses to permit relative swinging movement thereof, resilient portions of the bridge serving to move the lenses toward normal position, and nose guards each having operative connections with a lens and the bridge for operating the guards through an increased angle when the lenses are turned.

8. In eyeglasses, the combination with the lenses mounted to swing in a horizontal plane, of a bridge connecting them and having substantially rigid guides for insuring relative swinging movement of the lenses in a given plane, nose guards and operative connections between each guard and a lens and between each guard and the bridge for producing amplified movement of the guards for a given turning movement of the lenses.

9. In eyeglasses, the combination with the lenses, of a bridge having a substantially rigid central portion, and resilient horizontally-arranged loops formed in the bridge beyond the central portion, each loop having one arm coöperating with a part movable with a lens for permitting relative turning movement of the lenses in a horizontal plane and serving to return the lenses to normal position, and nose guards operated by the turning movement of the lenses.

10. In eyeglasses, the combination with the lenses having suitable attaching devices, of a bridge having relatively yielding portions toward each end and coöperating with parts movable with the lenses for permitting relative turning movement of the lenses, and nose guards each pivotally connected to the bridge and its corresponding attaching device.

11. In eyeglasses, the combination with the lenses and nose guards operated thereby, of a bridge for connecting the lenses embodying a rigid portion adapted to span the nose, resilient portions beyond having their free ends fixed to the lenses, and guiding means for insuring relative turning movement of the lenses in a given plane.

12. In eyeglasses, the combination with the lenses having suitable attaching devices thereon, of a bridge embodying a substantially rigid central portion and resilient loops near its ends, the ends of the loops being rigidly connected to the attaching devices, nose guards, and operating pins engaging each guard and operatively connected to the relatively fixed and movable arms of each loop.

13. In eyeglasses, the combination with the lenses, and suitable attaching devices secured thereto, of a bridge connecting the lenses having resilient portions, portions of the bridge engaging the sides of the attaching devices for insuring movement of the lenses in a given plane, nose guards engaging at the sides of the attaching devices opposite to the bridge portions, operating pins on the attaching devices engaging each guard, and screws passing through the attaching device and connecting the bridge and guards for causing movement of the latter when the lenses are operated and serving to hold the bridge and guards in coöperative relation with the attaching devices.

14. In eyeglasses, the combination with the lenses having suitable attaching devices thereon, of a bridge, connected to the attaching devices to permit the latter to swing relatively thereto, nose guards, and operating connections between each guard and an attaching device and between each guard and the bridge for producing increased angle of movement for the guards when the lenses are operated.

15. In an eyeglass mounting, the combination with a bridge, of a lens attaching device mounted to swing in a horizontal plane, and a nose guard mounted to swing in a horizontal plane about an axis unalined with the swinging axis of the lens attaching device.

16. In an eyeglass mounting, the combination with a bridge, of a lens attaching device mounted to turn relatively to the bridge substantially in a horizontal plane, a vertical pivot carried by the bridge unalined with the turning point of the lens attaching device, and a nose guard movable on the pivot and connected to the lens attaching device.

17. In an eyeglass mounting, the combination with a bridge, and a lens attaching device mounted to turn substantially in a horizontal plane, of a nose guard pivotally connected to the bridge and also to the lens attaching device to turn about a different axis.

18. In an eyeglass mounting, the combination with a bridge having a vertical pin thereon, of a lens attaching device mounted to turn relatively to the bridge substantially in a horizontal plane and having a vertical pin thereon, and a nose guard engaging the pin of the bridge and the pin of the lens attaching device.

19. In an eyeglass mounting, the combination with a bridge, of a lens attaching device mounted to swing relatively thereto, and a nose guard having a pivotal connection with the bridge and a separate unalined pivotal connection with the lens attaching device.

20. In eyeglasses, the combination with a bridge, of a pair of lenses mounted to swing in a substantially horizontal plane, and spring arms forming continuations of the bridge and moving parts swinging with the lenses to maintain the lenses in normal position.

21. An eyeglass bridge formed with vertical bearings near its ends and forwardly extending spring arms beyond the vertical bearings.

22. An eyeglass mounting comprising a bridge formed of flat stock and having spring arms extending rearwardly with the flat faces horizontally arranged and bending downwardly and forwardly flatwise of the material, and lens attaching members secured to the outer ends of the arms.

23. In an eyeglass mounting, the combination with a bridge, of a lens mounted to turn substantially in a horizontal plane, a nose guard mounted to turn substantially in a horizontal plane about a point different from the turning point of the lens, and a single spring for positioning the lens and the nose guard.

24. In eyeglasses, the combination with a bridge, of a lens mounted to swing relatively to the bridge, a nose guard mounted to swing relatively to the bridge and to the lens, and a single spring for controlling the relative movements of the bridge, the lens and the guard.

25. In eyeglasses, the combination with the lenses and nose guards, of a bridge having means for insuring relative turning movement of the lenses substantially in a horizontal plane, and resilient portions forming parts of the bridge and having the lenses rigidly secured thereto.

26. In eyeglasses, the combination with the lens attaching devices and nose guards, of a bridge having spring portions, the outer ends of said spring portions being rigidly secured to lens attaching devices and the bridge having at the inner ends of the spring portions guides on which the lens attaching devices move.

27. In eyeglasses, the combination with a bridge having spring loops at its ends, of lens attaching devices rigidly secured to the outer ends of the loops and guided on the bridge at the inner ends of the loops.

28. In eyeglasses, the combination with a bridge having rearwardly extending loops formed with forwardly extending spring arms, of lens attaching devices rigidly secured to the outer ends of the arms and guided substantially in a horizontal plane on the bridge at the inner ends of the loops.

29. In eyeglasses, the combination with a bridge having spring portions and lenses connected to the bridge, of nose guards pivotally mounted on the bridge, and having connections with the spring portions to cause the latter to position them.

30. In an eyeglass mounting, the combination with a bridge comprising a bridging portion and a spring portion, of a lens attaching device coöperating with the bridge at a point between the bridging portion and the spring portion, and a nose guard movable relatively to the lens attaching device and positioned by the spring portion.

31. In an eyeglass mounting, the combination with a bridge comprising a bridging portion and a forwardly extending spring arm, of a lens attaching device coöperating with the bridge at a point between the bridging portion and the spring arm, and a nose guard having pivotal connection with the bridge between the bridging portion and the spring arm and positioned by the latter.

32. In eyeglasses, the combination of a bridge comprising a bridging portion, vertical bearings and spring portions beyond the bearings, with nose guards mounted to turn on the vertical bearings and positioned by the spring portions, and lens attaching devices coöperating with the bridge between the bridging and the spring portions.

33. In eyeglasses, the combination with a bridge having spring portions and lenses mounted to swing substantially in a horizontal plane relatively to the bridge, of nose guards movable relatively to the bridge and to the lenses, positioned by the spring portions of the bridge and operated by the movement of the lenses.

LEO F. ADT.

Witnesses:
  D. D. CHURCH,
  CLARENCE A. BATEMAN.